US012279625B2

(12) United States Patent
Kapuganti

(10) Patent No.: US 12,279,625 B2
(45) Date of Patent: Apr. 22, 2025

(54) SYSTEM FOR DELAYING RIPENING OF AGRICULTURAL PRODUCE

(71) Applicant: National Institute of Plant Genome Research, Delhi New Delhi (IN)

(72) Inventor: Jagadis Gupta Kapuganti, New Delhi (IN)

(73) Assignee: NATIONAL INSTITUTE OF PLANT GENOME RESEARCH, New Delhi (IN)

( * ) Notice: Subject to any disclaimer, the term of this patent is extended or adjusted under 35 U.S.C. 154(b) by 414 days.

(21) Appl. No.: 17/622,569

(22) PCT Filed: May 1, 2020

(86) PCT No.: PCT/IN2020/050399
§ 371 (c)(1),
(2) Date: Dec. 23, 2021

(87) PCT Pub. No.: WO2021/181403
PCT Pub. Date: Sep. 16, 2021

(65) Prior Publication Data
US 2023/0087797 A1    Mar. 23, 2023

(30) Foreign Application Priority Data
Mar. 9, 2020 (IN) .............................. 202011010183

(51) Int. Cl.
*A23B 7/152* (2006.01)
(52) U.S. Cl.
CPC .......... *A23B 7/152* (2013.01); *A23V 2002/00* (2013.01)
(58) Field of Classification Search
CPC ................................. A23B 9/025; A23B 7/152
See application file for complete search history.

(56) References Cited

U.S. PATENT DOCUMENTS

| 6,451,363 B1 * | 9/2002 | Lidster ................. | A23B 7/152 47/84 |
| 8,512,780 B2 * | 8/2013 | Bell ....................... | B65D 81/18 426/118 |

(Continued)

FOREIGN PATENT DOCUMENTS

| CN | 107691634 A | 2/2018 |
| EP | 1092348 A1 | 4/2001 |
| WO | 2020/183491 A1 | 9/2020 |

OTHER PUBLICATIONS

Int'l Search Report and Written Opinion issued Dec. 10, 2020 in Int'l Application No. PCT/IN2020/050399.

(Continued)

*Primary Examiner* — Sean M Michalski
(74) *Attorney, Agent, or Firm* — Panitch Schwarze Belisario & Nadel LLP

(57) ABSTRACT

The present subject matter relates to a system (100, 200, 300) for delaying ripening process of agricultural produces (102, 202). The system (100, 200, 300) includes a first air-tight chamber (104, 204, 302) to hold a plant material (124, 228) in contact with a nitrite source (126, 230) and to receive a hypoxia-inducing source to create a hypoxic condition in first air-tight chamber (104, 204, 302) to enable production of nitric oxide by plant material (124, 228). A second air-tight chamber (106, 206) holds agricultural produce (102, 202). The second air-tight chamber (106, 206) comprises a first inlet (132, 236) connected to first outlet (130, 234) of first air-tight chamber (104, 204, 302) to expose agricultural produce (102, 202) to nitric oxide received from first air-tight chamber (104, 204, 302) for delaying ripening of agricultural produce (102, 202).

9 Claims, 3 Drawing Sheets

(56) References Cited

U.S. PATENT DOCUMENTS

| | | | | |
|---|---|---|---|---|
| 10,499,678 | B1* | 12/2019 | Patel | A23L 2/04 |
| 2010/0223944 | A1* | 9/2010 | Tsujimoto | A23L 3/3445 |
| | | | | 62/304 |
| 2014/0338373 | A1* | 11/2014 | Arrigo | F25D 17/042 |
| | | | | 62/62 |
| 2015/0257401 | A1* | 9/2015 | Brackmann | A23B 7/148 |
| | | | | 426/232 |
| 2016/0051714 | A1* | 2/2016 | Kim | A23B 4/16 |
| | | | | 426/318 |
| 2016/0183546 | A1* | 6/2016 | Garratt | F25D 11/003 |
| | | | | 99/470 |
| 2019/0000117 | A1* | 1/2019 | Ditzler | A23B 7/152 |

OTHER PUBLICATIONS

Leshem et al, "Harnessing Senescence Delaying Gases Nitric Oxide and Nitrous Oxide: a Novel Approach to Postharvest Control of Fresh Horticultural Produce," Biologia Plantarum, vol. 41, No. 1, pp. 1-10 (1998).

* cited by examiner

SYSTEM FOR DELAYING RIPENING OF AGRICULTURAL PRODUCE

CROSS-REFERENCE TO RELATED APPLICATIONS

This application is a Section 371 of International Application No. PCT/IN2020/050399, filed May 1, 2020, which was published under Publication No. WO2021/181403 on Sep. 16, 2021, and which claims priority under 35 U.S.C. § 119 (b) to Indian Application No. 202011010183, filed Mar. 9, 2020, the disclosures of which are incorporated herein by reference in their entirety.

FIELD OF INVENTION

The present subject matter relates, in general, to plant molecular biology, and, particularly, to a system for controlling the ripening of an agricultural produce. Specifically, the present subject matter relates to system that utilizes hypoxia-induced nitric oxide endogenously produced from a plant material for regulating the effects of post-harvest senescence in the agricultural produce.

BACKGROUND

Harvested agricultural produces, such as fruits and vegetables, may be stored and transported before reaching to consumers for consumption. The post-harvest storage and transportation of perishable agricultural produces may lead to rapid ripening. The ripening of an agricultural produce is a complex phenomenon involving genetically programmed biochemicals and hormones, such as ethylene, as well as physiological processes, such as increased respiration, culminating in changes in a texture and sensory attributes of the agricultural produce.

BRIEF DESCRIPTION OF DRAWINGS

The following detailed description references the drawings, wherein.

DETAILED DESCRIPTION

Figure 1:
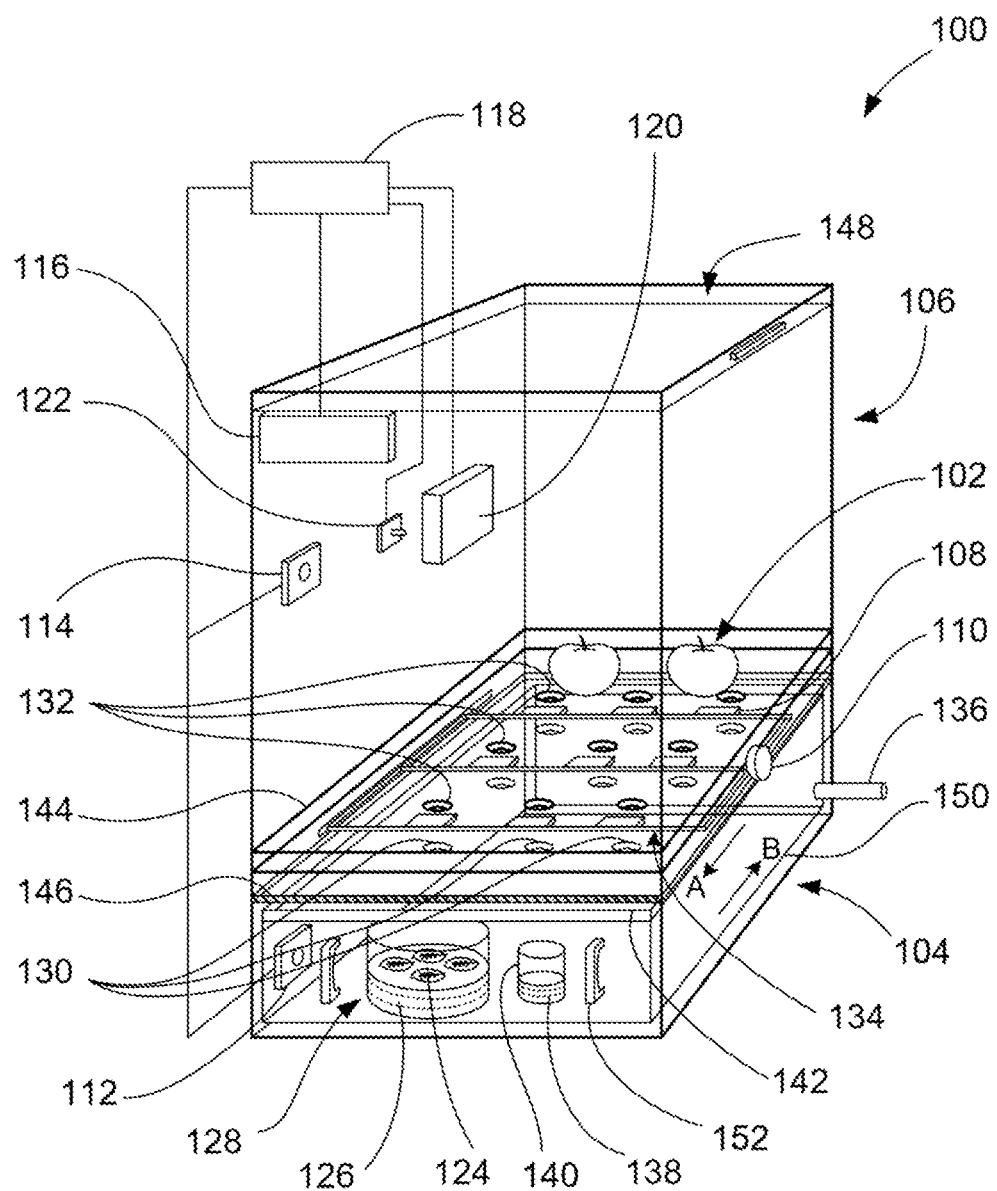
FIG. 1 shows a perspective view of a system for delaying the ripening of an agricultural produce, in accordance with an example implementation of the present subject matter.

In general, a natural ripening process of agricultural produces and goods is triggered subsequent to the harvesting. The agricultural produces may include fruits and vegetables. The natural ripening process of the agricultural produce may lead to spoilage or senescence. The spoilage is one of the major problems in the fruit and vegetable industry which results in the loss of a considerable amount of goods in their transit from farms to retail or processing outlets. The ripening of the agricultural produce may also result in softening of the agricultural produce, and thus making the agricultural produce prone to bruise damaging and susceptible to disease or other spoilage causing agents. Examples of the spoilage causing agents may include, but are not limited to, fungi, bacteria, yeast, and molds. Further, improper handling of the agricultural produces during packing, transportation, and storage may also result in damaging of the agricultural produces.

Another factor affecting the quality of agricultural produces is ambient temperature in which the agricultural produces are kept in storage and during transit. Proper temperature management is required in order to maintain the quality of fruits and vegetables in the duration between the harvesting and consumption of the agricultural produces.

The agricultural produces which are majorly affected by the natural ripening process are climacteric fruits. Examples of climacteric fruits include, but are not limited to, apples, tomatoes, bananas, apricots, melons, and various varieties of mango, kiwi, sugar apple, breadfruit, jackfruit, papaya, oriental persimmon, fig, apple, mango, banana, plantain, ross sapote, peach, apricot, plum, cherry, and guava.

The spoiling or senescence process observed in fruits and vegetables also results in short harvesting season for the goods and short shelf life of the goods following the harvesting process. Furthermore, the losses due to the spoilage and senescence result in a higher cost of the goods to the consumer.

Therefore, most of the agricultural produces necessitate post-harvest handling and treatments for controlling ripening of the agricultural produces in order to preserve the freshness of the agricultural produces, and thus maintain the quality of the produces reaching to the consumers.

Ethylene is a gaseous plant hormone which is a key signal compound involved directly in the regulation of all the stages of the ripening process of the agricultural produces. Ethylene, both internal and external to the agricultural produce, acts as environmental cues, to coordinate the modulation of biochemical events in mature fruits culminating in the ripening. Ethylene-signalling in fruits is a tightly coordinated activity under the influence of several developmental and environmental factors.

Due to the highly critical role played by ethylene in the ripening process of the agricultural produces, altering its biosynthesis and signalling could be used as an important means to delay the natural ripening process.

There are many signals that regulate ethylene production and its perception in different organs of plants. Among the various signalling molecules, the participation of Nitric Oxide (NO) signal has garnered particular interest in the recent years. NO has been shown to interfere with ethylene effects directly and significantly influence fruit ripening. In addition to senescence, NO has been also shown to have multiple roles in plants with effects on seed germination, stomatal function, root development, cell differentiation, lignification, and the floral transition. NO also plays an important role in biotic and abiotic stresses in plants.

Conventionally, controlling of the ripening of fruits and vegetables with the intention of increasing their shelf-life has been done by topical application of chemicals (including NO) to the fruit or vegetable.

A conventional technique utilizes an ethylene-production-inhibiting compound which comprising 2-cycloalkyl-1-aminocyclopropanecarboxylic acids or a derivative thereof.

Another conventional technique describes a fumigator for reducing the rate of ripening of perishable horticultural produce by fumigating said produce, subsequent to harvesting, with exogenously supplying chemicals which generate compounds, such as NO.

The application of chemical NO on fruits, vegetables, and cut flowers through an external (exogenous) source or a chemical NO donor is associated with various drawbacks. NO is a highly reactive molecule, therefore the use of chemical NO donor may result in the sudden release of NO at high peak. The NO, released at high peak in a very short duration may lead to reaction with biological components of the agricultural produce and thus inhibit essential activities of various enzymes which are involved in metabolism of the agricultural produce.

Further, the topical application of NO from NO chemical donors results in rapid release of NO, which is only able to block the ethylene pathway to a certain extent. Therefore, this methodology is unable to achieve very extended longevity of the agricultural produce. NO from the NO chemical donors may hereinafter be referred to as "chemical NO".

Another problem associated with the NO application through chemical NO donors is the damaging of the defence system of fruits and vegetables, via a process called Tyrosine nitration, when the chemical NO is applied at high amounts. Tyrosine nitration can inhibit protein function in fruits and vegetables, which negatively affects the quality of fruits and vegetables. Use of high amounts of the chemical NO can also lead to health complications of an operator personnel due to the ability of NO to inhibit mitochondrial complex IV.

Sodium nitroprusside (SNP) is an alternative NO donor which is widely used for preserving the freshness of fruits and vegetable. However, the application of SNP produces various gaseous compounds in addition to NO, such as Hydrogen cyanide, which are toxic for consumption.

Alternative improved donors of NO include S-nitrosoglutathione (GSNO). However, use of GSNO results in increased cost of controlling the ripening process of the agricultural produces.

Yet another conventional technique includes molecular genetic approaches leading to transgenic plants with impaired biosynthesis of ethylene. A complementary deoxyribonucleic acid (cDNA) clone for tomato ethylene-forming enzyme (EFE) (pTOM13) has been identified by inhibiting ethylene synthesis with an antisense gene expressed in transgenic plants. Further, it has also been identified that the expression of antisense Ribonucleic acid (RNA) to the rate-limiting enzyme in the biosynthetic pathway of ethylene, 1-aminocyclopropane-1-carboxylate synthase, inhibits fruit ripening in tomato plants. The above-mentioned techniques may alter the metabolism of the plants by a gene interrupting molecular procedure, which may result in degradation of the quality of the fruit or vegetable.

Although, the conventional techniques specifically address post-harvest storage life, these techniques are hampered by problems, such as high cost, side effects, and/or an inability to completely shut off ethylene production. Further, the conventional techniques involving chemical treatments, such as topical application of chemical NO on the produces and post-harvest fumigation of fruits and vegetables with NO, causes side effects by the NO releasing compounds.

Therefore, there is a need for a safe, economical and non-chemical system for controlling ripening and senescence in the agricultural produces that can easily and efficiently be utilized across a wide variety of species of agricultural produces.

The present subject matter describes a system for delaying the ripening process in an agricultural produce, which is capable of delaying the ripening process by introduction of NO endogenously produced by a plant material. The technique utilized by the system of the present subject matter is based on an endogenous production of a nitrite based nitric oxide from a plant material to counteract ethylene production from the agricultural produce to increase their shelf life.

NO-generated signals are being shown to transcriptionally antagonize ethylene pathway causing post-climacteric biochemical changes which are linked to agricultural produce quality by the following modes—
 (a) NO is involved in transcriptional inhibition of ethylene biosynthetic genes 1-Aminocycopropane 1-carboxylic acid oxidase (ACO) genes ACO1, ACO2 and ACO4.
 (b) Ethylene biosynthetic enzyme Methionine Adenosyltransferase (MAT) is subjected to post translational modification by NO leading to its inhibition.
 (c) NO and Aminocyclopropanecarboxylate oxidase (ACC) form a binary ACC oxidase-NO complex which is further chelated by ACC to produce a stable ternary ACC-ACC oxidase-NO complex which leads to its inhibition.
 (d) NO affects the yield of ethylene, thus delaying expressions of enzymes responsible for cell wall degradation, lignification and pigmentation of fruits conferring shelf life extension.

NO has multifaceted roles in post-harvest processing of the fruits and vegetables, such as delayed fruit and vegetable ripening, increased vitamin B6 and increased Iron (Fe) availability. NO may be produced in plants by oxidative and reductive pathways. The reductive pathways operate under hypoxic conditions. Imposing hypoxia leads to marked increased in NO production in plants. This NO production is in the range of 1 to 30 nanomoles.gram fresh weight per hour (nmoles.g FW. $h^{-1}$). For instance, exposing plant tissues, such as roots and leaves, under dark leads to production of high levels of NO. Hence, hypoxia-induced NO production can be used to reduce ethylene production and concomitant delay in ripening of fruits and vegetables.

In an example implementation of the present subject matter, a system is provided with a first chamber for holding a plant material. The plant material may be selected from leaves or roots of the plant. The system also includes a larger second chamber for holding the agricultural produce. The first chamber and the second chamber have air-tight structures and are connected with each other. Hypoxic condition is generated in the first chamber which triggers the endogenous generation of NO from the plant material. The generated NO may be transferred from the first chamber to the second chamber in which the agricultural produce is stored, for delaying the ripening of the agricultural produce.

The hypoxia-induced generation of NO from the plant material occurs at a physiological and continuous manner. The endogenous generation of NO prevents the occurrence of tyrosine nitration in the agricultural produce. Further, endogenous release of NO at physiological level also avoids any harm to the operators due to the exposure of the operator to the generated NO due to low quantity of generated NO. The sustained release of the NO also assists in a process called S-nitrosylation, which boosts the natural defence of the agricultural produce, and thus provides enhanced protection against pathogens. Since NO is released in a slow and continuous manner, it can also increase the longevity of the agricultural produce by several folds.

These and other advantages of the present subject matter would be described in a greater detail in conjunction with FIGS. 1-3 in the following description. The manner in which the surface finishing is implemented shall be explained in detail with respect to FIGS. 1-3. It should be noted that the description merely illustrates the principles of the present subject matter. It will thus be appreciated that those skilled in the art will be able to devise various arrangements that, although not explicitly described herein, embody the principles of the present subject matter and are included within its scope. Furthermore, all examples recited herein are intended only to aid the reader in understanding the principles of the present subject matter. Moreover, all statements herein reciting principles, aspects and implementations of the present subject matter, as well as specific examples thereof, are intended to encompass equivalents thereof.

FIG. 1 shows a perspective view of a system 100 for delaying the ripening of an agricultural produce 102, in accordance with an example implementation of the present subject matter. The system 100 includes a first air-tight chamber 104, a second air-tight chamber 106, valves 108, an actuator 110, a first sensor 112, a second sensor 114, a display unit 116, a control unit 118, a temperature controller 120, and a temperature sensor 122. In an example, the first air-tight chamber 104 and the second air-tight chamber 106 may be manufactured from polyacrylic. The first air-tight chamber 104 holds a plant material 124. The plant material 124 may include at least one of leaves and roots of a plant. Example of plant material 124 may include, but are not limited to, leaves of *Murraya koenigii* plant, leaves of *Anethum graveolens* plant, *Lactuca sativa*, leaves of *Solanum lycopersicum* plant, and combinations thereof. In an example, the plant material 124 is kept in contact with a nitrite source 126. In an example, the first air-tight chamber 104 includes a container 128 for holding the plant material 124. The container 128 may be a vial. In another example, the container 128 may hold the plant material 124 and the nitrite source 126. In an example, the nitrite source 126 may be a nitrite solution. In an example, the nitrite solution may be one of potassium nitrite solution, sodium nitrite, and calcium nitrite.

Further, the first air-tight chamber 104 may be formed to receive a hypoxia-inducing source to create a hypoxic condition in the first air-tight chamber 104. The hypoxic condition, created in the first air-tight chamber 104, enables production of nitric oxide by the plant material 124. The first air-tight chamber 104 further includes a first outlet 130. Although, the system 100 shown in FIG. 1 has multiple first outlets 130 in the first air-tight chamber 104, in an example, the first air-tight chamber may include only one first outlet.

The second air-tight chamber 106 holds the agricultural produce 102. The second air-tight chamber 106 includes a first inlet 132 connected to the first outlet 130 of the first air-tight chamber 104 for exposing the agricultural produce 102 kept in the second air-tight chamber 106 to the nitric oxide received from the first air-tight chamber 104 for delaying ripening of the agricultural produce 102. Although, the system 100 shown in FIG. 1 has multiple first inlets 132 in the second air-tight chamber 106, in an example, the second air-tight chamber may include only one first inlet.

Further, although, the system 100 shown in FIG. 1 has multiple valves 108, in an example, the system 100 having one first outlet in the first air-tight chamber and one first inlet in the second air-tight chamber may include only one valve. It may be understood that one valve is associated with one first outlet and one first inlet.

Each valve 108 may be placed in between the respective first outlet 130 and the respective first inlet 132. The actuator 110 is connected to each of the valves 108. The actuator 110 is operable for actuating the valves 108 to control a flow of nitric oxide from the first air-tight chamber 104 to the second air-tight chamber 106. In an example, the valves 108 and the actuator 110 are manually operable valves and a manually operable actuator, respectively, or automated valves and an automated actuator, respectively.

The first sensor 112 is an oxygen sensor and is disposed in the first air-tight chamber 104 for determining an oxygen level inside of the first air-tight chamber 104. The second sensor 114 is a Nitric Oxide (NO) sensor and is disposed in the second air-tight chamber 106 for determining an NO level inside of the second air-tight chamber 106. The display unit 116 is communicably coupled to the first and the second sensors 112, 114 to display the oxygen level determined by the first sensor 112 and the NO level determined by the second sensor 114.

In an example, the system 100 includes a control unit 118 coupled to the first sensor 112, the second sensor 114, and the display unit 116. The control unit 118 acquires the determined oxygen and NO levels from the first sensor 112 and the second sensor 114 and displays the determined values on the display unit 116.

The display unit 116 provides the determined values to a user of the system 100, and, according to the displayed values, the user may manually operate the manually operable actuator to actuate the manually operable valves in an opened state or a closed state in order to control the flow of NO from the first air-tight chamber 104 to the second air-tight chamber 106. In the opened state, a valve 108 allows the flow of NO from the first air-tight chamber 104 to the second air-tight chamber 106. In the closed state, a valve 108 stops the flow of NO from the first air-tight chamber 104 to the second air-tight chamber 106.

The multiple valves 108 may be arranged in a valve array 134. In another example implementation, the valve array 134 are arranged in a slidable manner with the help of a set of sliding channels abutted on two opposite facing sides of the system 100. In an example implementation, the valve array 134 is coupled to the actuator 110 in a rack and pinion arrangement.

In an example, the actuator 110 is rotatable, where a movement of the actuator 110 in a clockwise direction corresponds to a movement of the valve array 134 in a direction A. The movement of the valve array 134 in the direction A switches the multiple valves 108 to the opened state. In said example, a movement of the actuator 110 in an anti-clockwise direction corresponds to a movement of the valve array 134 in a direction B. The movement of the valve array 134 in the direction B switches the multiple valves 108 to the closed state. It may be understood that a partial movement of the actuator 110 in the clockwise direction or in the anti-clockwise direction may partially open the multiple valves 108, which may allow for a controlled flow of nitric oxide from the first air-tight chamber 104 to the second air-tight chamber 106.

In an example, the actuator 110 is slidable, where a sliding movement of the actuator 110 in the direction A corresponds to a sliding movement of the valve array 134 in the direction A. The movement of the valve array 134 in the direction A switches the multiple valves 108 to the opened state. The sliding movement of the actuator 110 in the direction B corresponds to a sliding movement of the valve array 134 in the direction B. The movement of the valve array 134 in the direction B switches the multiple valves 108 to the closed state.

In the system 100 having the automated valves and automatically operable actuator, the control unit 118 is coupled to the automatically operable actuator. The control unit 118, upon determining by the first sensor 112 that the oxygen level inside of the first air-tight chamber 104 is below a predetermined value of oxygen level, operates the actuator 110 to actuate the valves 108 in the opened state or the closed state to control the flow of the nitric oxide from the first air-tight chamber 104 to the second air-tight chamber 106. In an example, the control unit 118, upon determining by the second sensor 114 that the nitric oxide level inside of the second air-tight chamber 106 is above a predetermined value of nitric oxide level, operates the actuator 110 to actuate the valves 108 to stop the flow of the nitric oxide from the first air-tight chamber 104 to the second air-tight chamber 106.

In an example, the hypoxia-inducing source received in the first air-tight chamber 104 may be a nitrogen gas. The first air-tight chamber 104 includes a second inlet 136 for receiving the nitrogen gas for inducing the hypoxic condition in the first air-tight chamber 104. The second inlet 136 may be connected a nitrogen gas supply (not shown). The nitrogen gas may be received in the first air-tight chamber 104 in 2 to 4 pulses in every 24 hours. Each of the pulses of the nitrogen gas may be of a time period in a range of 5 to 15 minutes.

In another example, the hypoxia-inducing source is an oxygen quencher sachet 138. The oxygen quencher sachet 138 may include a reduced iron and sodium chloride solution. In an example, the oxygen quencher sachet 138 is kept in a vial 140. The oxygen quencher sachet 138, when kept in an enclosed space reduces the oxygen content of the space. In an example, the oxygen quencher sachet 138 is placed inside the first air-tight chamber 104. In another example, the oxygen quencher sachet 138 is placed outside the first air-tight chamber 104 and is connected with the first air-tight chamber 104.

In yet another example, the hypoxia-inducing source may be germinating seeds (not shown). The germinating seeds are high oxygen consuming seeds. Examples of the germinating seeds may include, but are not limited to, germinating chickpea seeds, germinating pigeon pea seeds, germinating wheat, germinating mung bean seeds, and a combination thereof.

In yet another example, the hypoxia-inducing source may be a combination of the nitrogen gas, the oxygen quencher sachet 138, or the germinating seeds.

According to an example implementation, the first air-tight chamber 104 includes a first lid 142. The first lid 142, when in an assemble state, enables an air-tight capability of the first air-tight chamber 104. The second air-tight chamber 106 includes a second lid 144. The second lid 144, when in an assembled state, may enable an air-tight capability of the second air-tight chamber 106.

In an example, the first lid 142 includes the multiple first outlets 130 and the second lid 144 includes the multiple first inlets 132. Although, the system 100 shown in FIG. 1 has multiple first outlets 130 in the first lid 142, in an example, the first lid 142 may include only one first outlet. Similarly, although, the system 100 shown in FIG. 1 has multiple first inlets 132 in the second lid 144, in an example, the second lid 144 may include only one first inlet.

In an example implementation, the system 100 includes a common separation wall 146 for separating the first air-tight chamber 104 and the second air-tight chamber 106. The common separation wall 146 may be formed by an attached arrangement of the first lid 142 and the second lid 144. The common separation wall 146 formed from the first lid 142 and the second lid 144 may include one or more first outlets 130, one or more first inlets 132, and one or more valves 108.

In an example, the second air-tight chamber 106 includes a third lid 148 for allowing the user to keep the agricultural produce 102 in the second air-tight chamber 106. The third lid 148 ensures an air-tight closure of the second air-tight chamber 106.

In an example, the first air-tight chamber 104 includes a removable tray 150 for keeping the container 128, containing the plant material 124 and the nitrite source 126, and the oxygen quencher sachet 138. The removable tray 150 may have a drawer structure and may include at least one handle 152 for sliding the tray in the direction A for pulling out the removable tray 150 from the first air-tight chamber 104 or in the direction B for pushing in the removable tray 150 into the first air-tight chamber 104. The removable tray 150 allows the user to easily keep, remove, or replace the plant material 124 and the oxygen quencher sachet 138 in the first air-tight chamber 104. In another example, the plant material 124 and the nitrite source 126 are kept on the tray 150 without using the container 128 as a holding means.

The temperature controller 120 may be provided for regulating the temperature of the second air-tight chamber 106. In an example, the temperature controller 120 is a thermoelectric cooler. In an example, the thermoelectric cooler is a Peltier cooling module. The temperature sensor 122 is placed inside the second air-tight chamber 106 for measuring the temperature of the second air-tight chamber 106. In an example, the temperature controller 120 and the temperature sensor 122 are connected to the control unit 118. The control unit 118 may acquire the temperature measured by the temperature sensor 122 and may provide inputs to the temperature controller 120 for controlling the ambient temperature of the second air-tight chamber 106. Further, the control unit 118 may display the temperature measured by the temperature sensor 122.

The description herein describes the operation of the system 100 for controlling the ripening of an agricultural produce 102. At first, the user may put the plant material 124 and the oxygen quencher sachet 138 in the first air-tight chamber 104. Further, the user may put the agricultural produce 102 in the second air-tight chamber 106. The oxygen quencher sachet 138 creates a hypoxic condition in the first air-tight chamber 104. Further, the user may provide a hypoxia-inducing source in the first air-tight chamber 104, which further reduces the oxygen content in the first air-tight chamber 104. The plant material 124 produces NO under the effect of the hypoxic condition created in the first air-tight chamber 104. The control unit 118 acquires the determined oxygen level values from the first sensor 112. Further, the control unit 118 displays the determined oxygen level values on the display unit 116. Upon determination that the oxygen level inside of the first air-tight chamber 104 is below a predetermined value of oxygen level, the valve 108 is actuated to allow the flow of NO from the first air-tight chamber 104 to the second air-tight chamber 106. The agricultural produce 102, kept in the second air-tight chamber 106, is introduced to NO transferred from the first air-tight chamber 104. The second sensor 114 determines the NO level inside of the second air-tight chamber 106. Upon determination that the NO level inside of the second air-tight chamber 106 is above a predetermined value of NO level, the valve 108 is actuated to stop the flow of NO from the first air-tight chamber 104 to the second air-tight chamber 106. The temperature sensor 122 placed in the second air-tight chamber 106 determines a temperature inside of the second air-tight chamber 106. The control unit 118 acquires the determined temperature form the temperature sensor 122 and displays the determined temperature on the display unit 116. The temperature controller 120 decreases the temperature inside of the second air-tight chamber 106, upon increase in the determined temperature above a predetermined temperature value. The temperature controller 120 increases the temperature inside of the second air-tight chamber 106, upon decrease in the determined temperature below a predetermined temperature value. The controlled release of endogenously produced NO provided to the second air-tight chamber 106 by the system 100 delays the ripening of the agricultural produce 102, stored in the second air-tight chamber 106. Further, the temperature regulation by the temperature controller 120, based on the determined temperature by the temperature sensor 122, allows to preserve the freshness of the agricultural produce 102 by providing favorable temperature condition to the stored agricultural produces 102.

Figure 2:
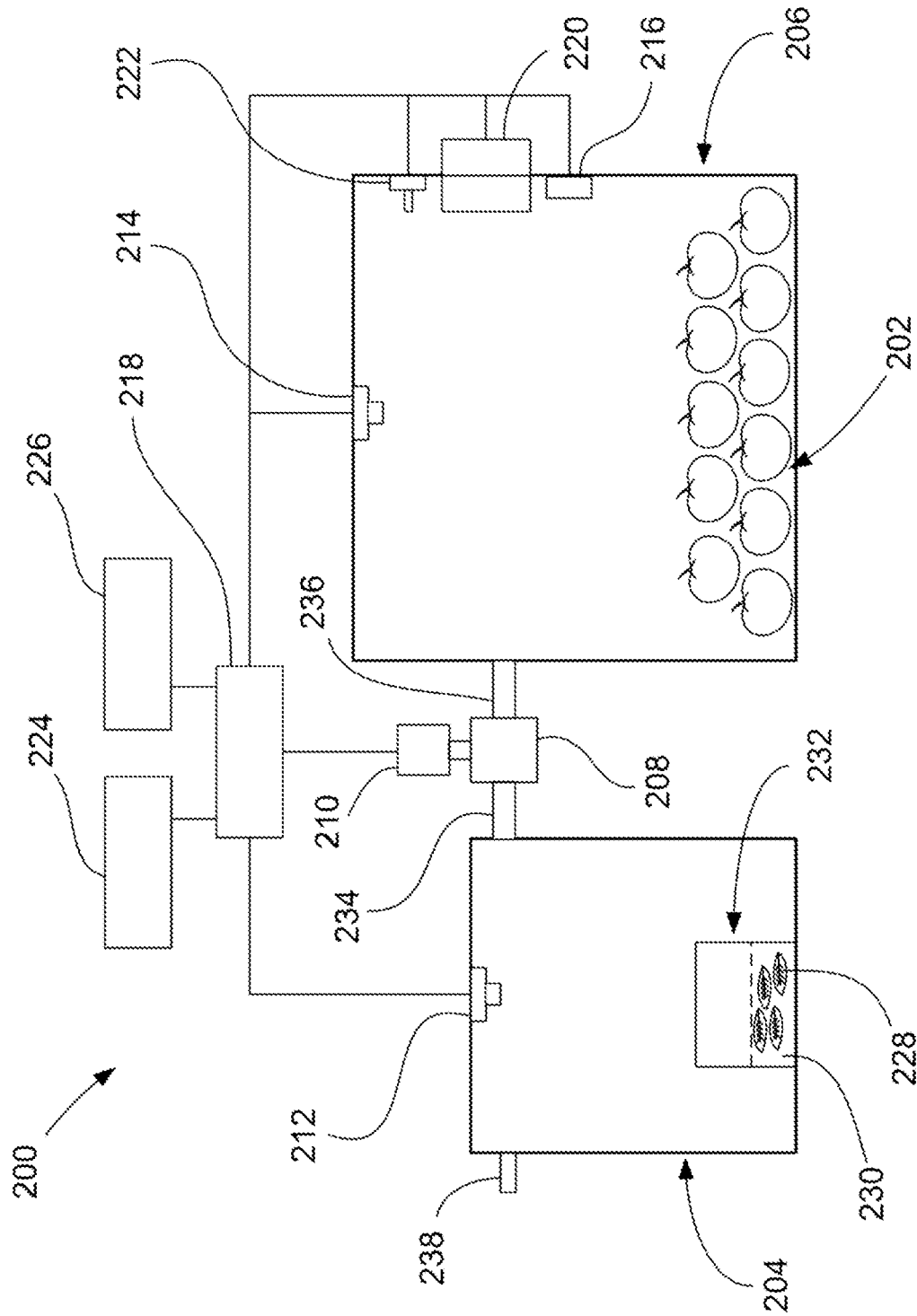
FIG. 2 shows a schematic diagram of a system for delaying the ripening of an agricultural produce, in accordance with an example implementation of the present subject matter.

FIG. 2 shows a schematic diagram of a system 200 for delaying the ripening of an agricultural produce 202, in accordance with an example implementation of the present subject matter. The system 200 of FIG. 2 may include a first air-tight chamber 204, a second air-tight chamber 206, a valve 208, an actuator 210, a first sensor 212, a second sensor 214, a display unit 216, a control unit 218, a temperature controller 220, a temperature sensor 222, a memory 224, and an input unit 226. The first sensor 212, the second sensor 214, the display unit 216, the control unit 218, the temperature controller 220, and the temperature sensor 222 of the system 200 of FIG. 2 may be similar in function to the first sensor 112, the second sensor 114, the display unit 116, the control unit 118, the temperature controller 120, and the temperature sensor 122 of the system 100 of FIG. 1, thus the functions of these components has not been explained herein in detail for the sake of brevity.

The first air-tight chamber 204 and the second air-tight chamber 206 of the system 200 of FIG. 2 may be separately placed. The first air-tight chamber 204 may hold a plant material 228 kept in contact with a nitrite source 230. In an example, the first air-tight chamber 204 may include a container 232 for holding the plant material 228. The container 232 may be a vial. In another example, the container 232 may hold the plant material 228 and the nitrite source 230. In an example, the nitrite source 230 is a nitrite solution. In an example, the nitrite solution is a potassium nitrite solution. Further, the first air-tight chamber 204 may be designed to receive a hypoxia-inducing source to create a hypoxic condition in the first air-tight chamber 204.

The hypoxic condition created inside the first air-tight chamber 204 may enable production of nitric oxide by the plant material 228 kept in the first air-tight chamber 204. The first air-tight chamber 204 may include a first outlet 234. The second air-tight chamber 206 may hold the agricultural produce 202. Further, the second air-tight chamber 206 may include a first inlet 236 which is connected to the first outlet of the first air-tight chamber 204 for exposing the agricultural produce 202 to the nitric oxide received from the first air-tight chamber 204 to delay the ripening of the agricultural produce 202. In an example, the first outlet of the first air-tight chamber 204 and the first inlet of the second air-tight chamber 206 may have a tube structure.

The hypoxia-inducing source may be selected from a group including nitrogen gas, an oxygen quencher sachet (not shown in FIG. 2), and germinating seeds (not shown). The first air-tight chamber 204 may include a second inlet 238 for receiving the nitrogen gas in the first air-tight chamber 204.

The first sensor 212, similar to the first sensor 112 of FIG. 1, may determine the oxygen level inside of the first air-tight chamber 204, and the second sensor 214, similar to the second sensor 114 of FIG. 1, may determine the NO level inside of the second air-tight chamber 206. In an example, the first sensor 212 is an oxygen sensor, and the second sensor 114 is an NO sensor.

In an example, the display unit 216 is communicably coupled to the first and the second sensors 212, 214 to display the oxygen level determined by the first sensor 212 and the NO level determined by the second sensor 214.

The valve 208 may be placed in between the first outlet 234 and the first inlet 236. The actuator 210 is connected to the valve 208. The actuator 210 is operable for actuating the valve 208 to control a flow of nitric oxide from the first air-tight chamber 204 to the second air-tight chamber 206. In an example, the valve 208 and the actuator 210 are manually operable valve and a manually operable actuator, respectively, or automated valve and an automated actuator, respectively.

The display unit 216 provides the determined values to a user of the system 200, which may then manually actuate the manually operable actuator to open, close, partially close the manually operable valve in order to control the flow of NO from the first air-tight chamber 204 to the second air-tight chamber 206.

In an example, the control unit 218, upon determining by the first sensor 212 that the oxygen level inside of the first air-tight chamber 204 is below a predetermined value of oxygen level, may operate the actuator 210 to actuate the valve 208 to allow the flow of the nitric oxide from the first air-tight chamber 204 to the second air-tight chamber 206. In said example, the control unit 218, upon determining by the second sensor 214 that the nitric oxide level inside of the second air-tight chamber 206 is above a predetermined value of nitric oxide level, may operate the actuator 210 to actuate the valve 208 to stop the flow of the nitric oxide from the first air-tight chamber 204 to the second air-tight chamber 206.

The memory 224 may store the predetermined value of the oxygen level and the predetermined value of nitic oxide level. The memory 224 may be a non-volatile memory. Examples of the non-volatile memory may include, but are not limited to, a flash memory and a magnetic storage device. In an example, the memory 224 is a built-in memory of the control unit 218.

The input unit 226 may allow a user to input the predetermined value of the oxygen level and the predetermined value of the nitic oxide level. Examples of the input unit 226 may include, but are not limited to, a keypad, a touchscreen, and a control knob.

Different categories of agricultural produces 202 may require processing at different levels of nitric oxide. The capability of the system 200 for allowing the user to manually define the predetermined values of the oxygen level and nitric oxide level is useful to define different values for different category of the agricultural produce 202.

Figure 3:
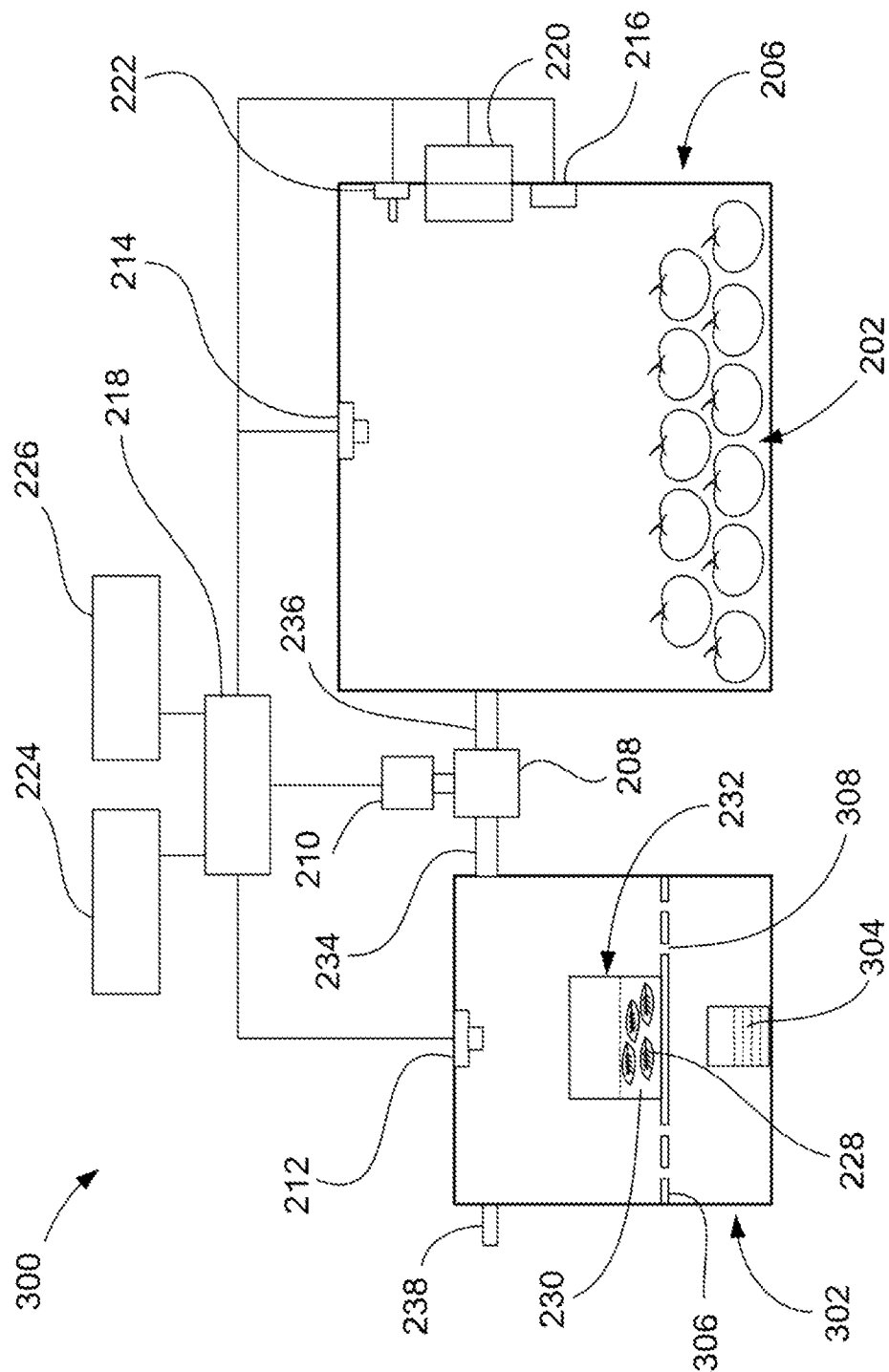
FIG. 3 shows a schematic diagram of a system for delaying the ripening of an agricultural produce, in accordance with an example implementation of the present subject matter.

FIG. 3 shows a schematic diagram of a system 300 for delaying the ripening of an agricultural produce 202, in accordance with an example implementation of the present subject matter. The system 300 of FIG. 3 includes a first air-tight chamber 302, the second air-tight chamber 206, the valve 208, the actuator 210, the first sensor 212, the second sensor 214, the display unit 216, the control unit 218, the temperature controller 220, the temperature sensor 222, the memory 224, and the input unit 226. As the components 202, 206, 208, 210, 212, 214, 216, 218, 220, 222, 224, and 226 have been explained in detail with reference to FIG. 2, the same are not explained again for the sake of brevity.

The first air-tight chamber 302 of the system 300 of FIG. 3 includes the plant material 228, same as the plant material 228 of FIG. 2, kept in contact with the nitrite source 230, same as the nitrite source 230 of FIG. 2. Further, in an example, the first air-tight chamber 302 also includes an oxygen quencher sachet 304.

In another example, the first air-tight chamber 302 includes the plant material 228 kept in contact with the nitrite source 230 and germinating seeds. In the present example implementation, the germinating seeds may perform the oxygen quenching in the first air-tight chamber 302 for generating hypoxic condition.

In yet another example, the first air-tight chamber 302 includes a combination of the plant material 228 kept in contact with the nitrite source 230, the oxygen quencher sachet 304, and the germinating seeds.

In an example, the nitrite source 230 is a nitrite solution. In an example, the nitrite solution is a potassium nitrite solution.

In the system 300 of FIG. 3, the oxygen quencher sachet 304 and the plant material 228 are separated by a partition wall 306. The partition wall 306 may include a set of openings 308 for connecting the plant material 228 and the oxygen quencher sachet 304. The set of openings 308 allow for a controlled quenching of oxygen form a space in which the plant material 228 is placed.

In an example implementation of the system of the present subject matter, the first air-tight chamber holds the plant material kept in contact with a nitrite solution. The second air-tight chamber can be a space to store the agricultural produce, and the first air-tight chamber can be placed inside the second air-tight chamber.

In an example, the space for storing the agricultural produces may be an air-tight room. The present example implementation, with the second air-tight chamber as an air-tight room, may allow the user to utilize a large space for the storage of the agricultural produces, thus increasing the overall capacity of the system of the present subject matter by several folds. This implementation can be useful for farmers and for retail and processing facilities for storing the harvested agricultural produce.

In another example, the space for storing the agricultural produces may be a cargo space of a transport vehicle utilized for transporting the agricultural produces from a source, such as farms, to the destination, such as retail and processing facilities.

In an example, the system of the present subject matter is provided with a portable power source for ensuring portability of the system in various applications, for example in the transportation of the agricultural produces. In an example, the portable power source is a battery arrangement. In another example, the portable power source is a solar power module.

The above implementation of the system may provide an efficient medium for road, air, and sea transportation of various agricultural produces while preventing and/or delaying spoilage of fruits and vegetables in a transit stage, and thus preserving the quality of the fruits and vegetables.

The temperature controller regulates the temperature in which the agricultural produces are stored, which provides a favourable environment for the agricultural produces and thus ensuring that the post-harvest freshness of the agricultural produces is effectively maintained.

The chambers of the system of the present subject matter may be manufactured from polyacrylic, and the system may be manufactured using minimum components, which reduces overall cost related to the storage and transportation of the agricultural produces while delaying the ripening process of the agricultural produces.

The structure and working of the system of the present subject is simple and require minimum scientific assistance, thus making the system a user-friendly application for farmers. Further, the system may also eliminate the requirement of refrigeration and chemical treatment of the agricultural produces during storage and transportation, which eliminates high-power requirement for refrigeration and side-effects caused due to chemical treatment of the produces.

Thus, the system of the present subject matter ensures increase in the shelf life of the fruits and vegetables in a cost-effective and user-friendly manner, while maintaining adequate nutrient availability of fruits and vegetables under postharvest storage and transportation.

Although examples for the present disclosure have been described in language specific to structural features and/or methods, it is to be understood that the appended claims are not limited to the specific features or methods described herein. Rather, the specific features and methods are disclosed and explained as exemplary implementations of the present disclosure.

I claim:

1. A system (100, 200, 300) comprising:
 a first air-tight chamber (104, 204, 302) to hold a plant material (124, 228) in contact with a nitrite source (126, 230) and to receive a hypoxia-inducing source to create a hypoxic condition in the first air-tight chamber (104, 204, 302) to enable production of nitric oxide by the plant material (124, 228), wherein the first air-tight chamber (104, 204, 302) comprises a first outlet (130, 234);
 a second air-tight chamber (106, 206) to hold an agricultural produce (102, 202), wherein the second air-tight chamber (106, 206) comprises a first inlet (132, 236) connected to the first outlet (130, 234) of the first air-tight chamber (104, 204, 302) to expose the agricultural produce (102, 202) to the nitric oxide received from the first air-tight chamber (104, 204, 302) for delaying ripening of the agricultural produce (102, 202);
 a valve (108, 208) placed in between the first outlet (130, 234) and the first inlet (132, 236);
 an actuator (110, 210) connected to the valve (108, 208), wherein the actuator (110, 210) is operable to actuate the valve (108, 208) to control a flow of nitric oxide from the first air-tight chamber (104, 204, 302) to the second air-tight chamber (106, 206);
 an oxygen sensor (112, 212) disposed in the first air-tight chamber (104, 204, 302) to determine an oxygen level inside of the first air-tight chamber (104, 204, 302);
 a nitric oxide sensor (114, 214) disposed in the second air-tight chamber (106, 206) to determine a nitric oxide level inside of the second air-tight chamber (106, 206); and
 a control unit (118, 218) coupled to the oxygen sensor (112, 212), the nitric oxide sensor (114, 214), and the actuator (110, 210),
 wherein, upon determining by the oxygen sensor (112, 212) that the oxygen level inside of the first air-tight chamber (104, 204, 302) is below a predetermined value of oxygen level, the control unit (118, 218) is to operate the actuator (110, 210) to actuate the valve (108, 208) to allow the flow of the nitric oxide from the first air-tight chamber (104, 204, 302) to the second air-tight chamber (106, 206), and
 wherein, upon determining by the nitric oxide sensor (114, 214) that the nitric oxide level inside of the second air-tight chamber (106, 206) is above a predetermined value of nitric oxide level, the control unit (118, 218) is to operate the actuator (110, 210) to actuate the valve (108, 208) to stop the flow of the nitric oxide from the first air-tight chamber (104, 204, 302) to the second air-tight chamber (106, 206).

2. The system (100, 200, 300) as claimed in claim 1, wherein the system (100, 200, 300) comprises:
   a display unit (116, 216) to display the oxygen level determined by the oxygen sensor (112, 212).

3. The system (100, 200, 300) as claimed in claim 1, wherein the system (100, 200, 300) comprises:
   a display unit (116, 216) to display the nitric oxide level determined by the nitric oxide sensor (114, 214).

4. The system (100, 200, 300) as claimed in claim 1, wherein the system (100, 200, 300) comprises a memory (224) to store a predetermined value of oxygen level and a predetermined value of nitric oxide level.

5. The system (100, 200, 300) as claimed in claim 4, wherein the system includes an input unit (226) for a user to input the predetermined value of oxygen level and the predetermined value of nitric oxide level, wherein the input unit (226) comprises one of a keypad, a touchscreen, and a control knob.

6. The system (100, 200, 300) as claimed in claim 1, wherein the hypoxia-inducing source includes a nitrogen gas, and wherein the first air-tight chamber (104, 204, 302) comprises a second inlet (136, 238) to receive the nitrogen gas for inducing the hypoxic condition in the first air-tight chamber (104, 204, 302).

7. The system (100, 200, 300) as claimed in claim 6, wherein the nitrogen gas is received in the first air-tight chamber (104, 204, 302) in 2 to 4 pulses in every 24 hours, wherein each of the pulses is of a time period in a range of 5 to 15 minutes.

8. The system (100, 200, 300) as claimed in claim 1, wherein the system (100, 200, 300) comprises:
   a temperature controller (120, 220) to regulate a temperature of the second air-tight chamber (106, 206);
   a temperature sensor (122, 222) to measure the temperature of the second air-tight chamber (106, 206); and
   a display unit (116, 216) to display the measured temperature.

9. The system (100, 200, 300) as claimed in claim 1, wherein the first air-tight chamber (104) and the second air-tight chamber (106) have a common separation wall (146), wherein the first outlet (130), the first inlet (132), and the valve (108) are in the separation wall (146).

* * * * *